United States Patent Office 3,374,228
Patented Mar. 19, 1968

3,374,228
14β-ESTRA-1,3,5(10)-TRIENES
John H. Fried, Palo Alto, Calif., assignor to Syntex Corporation, Panama, Panama, a corporation of Panama
No Drawing. Filed Oct. 25, 1965, Ser. No. 505,191
4 Claims. (Cl. 260—239.55)

ABSTRACT OF THE DISCLOSURE 3-tetrahydropyranyloxy- and/or 17α-tetrahydropyranyloxy-18-methyl-14β-estra-1,3,5(10)-trienes, optionally substituted at C-3 with hydroxy or alkoxy, or at C-17α with hydroxy or an ester thereof, and at C-17β with hydrogen, (lower)alkyl, (lower)alkenyl, (lower)alkynyl or halo (lower)alkylnyl, are estrogenic agents.

The present invention is directed at cyclopentanopolyhydrophenanthrene derivatives, specifically to 14β-estra-1,3,5(10)-trienes of the formula:

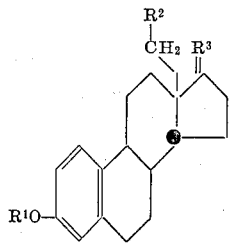

wherein $R^1$ is hydrogen, (lower)alkyl, or tetrahydropyranyl
$R^2$ is hydrogen or methyl
$R^3$ is keto or the group

in which
$R^4$ is hydrogen, tetrahydropyranyl or a hydrocarbon carboxylic acyl group of less than 12 carbon atoms and
$R^5$ is hydrogen, (lower)alkyl, (lower)alkenyl, (lower)alkynyl or halo(lower)alkynyl.

By the term "(lower)alkyl," and derivations thereof such as "(lower)alkenyl" and "(lower)alkynyl" is intended a branched or straight chian hydrocarbon group of six or less carbon atoms. In the case of olefinic groups, such will contain at least two carbon atoms. Representations of such (lower)alkyl groups are thus methyl, ethyl, propyl, butyl, pentyl and hexyl; of such (lower)alkynyl groups are vinyl, propargyl and the like; and of such (lower)alkynyl groups are ethynyl, propynyl and the like.

The hydrocarbon carboxylic acyl and acyloxy groups of the present invention will contain less than 12 carbon atoms and may be of a straight, branched, cyclic or cyclicaliphatic chain structure. These may be saturated, unsaturated or aromatic and optionally substituted by functional groups such as hydroxy, alkoxy containing up to 5 carbon atoms, acyloxy containing up to 12 carbon atoms, nitro, amino, halogeno, and the like. Typical esters thus include acetate, propionate, enanthate, benzoate, trimethylacetate, t - butylacetate, phenoxyacetate, cyclopentylpropionate, aminoacetate, β-chloropropionate, adamantoate, and the like.

The compounds of the present invention demonstrate estrogenic activity and are useful in the treatment of conditions usually responsive to such agents. In addition, these compounds can be employed in the control of fertility.

The preparation of these compounds from readily available starting materials may be summarized as follows. A halogen atom, preferably chloro or bromo, is introduced in the 16-position of a 3-alkoxyestra-1,3,5(10)-trien-17-one. This halogen may be introduced either by converting a 17-ketone to its enol acetate with isopropenylacetate and p-toluenesulfonic acid and thereafter treating the enol acetate with isopropenylacetate and p-toluenesulfonic acid and thereafter treating the enol acetate with chlorine or bromine in an inert solvent and the presence of proton acceptor such as potassium carbonate, or by first converting the 17-ketone to its ethylene ketal and thereafter treating this with pyridinium bromide perbromide to yield the 16-bromo-17,17-ethylenedioxy derivative. Since in the following step the 17-keto group should be protected, it is desirable when introducing the halogen atom via the former route that the resultant 16-halo-17-keto compound be converted to the 17-ethylene ketal through the action of ethylene glycol in the presence of p-toluenesulfonic acid or dinitrobenzenesulfonic acid.

The resulting 3 - alkoxy - 16 - halo-17,17-ethylenedioxyestra-1,3,5(10)-triene or the corresponding 18-methyl compound is then heated with potassium butoxide, either by refluxing in an inert solvent such as xylene or heating the reactants in a sealed tube. Upon completion of this dehydrohalogenation, the resultant $\Delta^{14}$-dehydro intermediate, which may contain some $\Delta^{15}$ tautomer, is treated with acid, such as methanolic hydrochloric acid, to regenerate the 17-keto compound while simultaneously inverting the C-14 configuration in any $\Delta^{15}$ tautomer. The mixture of $\Delta^{14}$ and 14β-$\Delta^{15}$ isomers is then catalytically hydrogenated to yield a 3-alkoxy-14β-estra-1,3,5(10)-trien-17-one or a 3-alkoxy-18-methyl-14β-estra-1,3,5(10)-trien-17-one.

When a hydroxy group is desired in the 3-position of the final compound, this 3-alkoxy-17-keto compound is fused with pyridium bromide to cleave the 3-alkoxy group. The resultant 3-hydroxy-14β-estra-1,3,5(10)-trien-17-one or the corresponding 18-methyl compound may then be subjected to the following reactions or may first be converted to the 3-tetrahydropyranyloxy derivatives as through the action of dihydropyran in the presence of an acid catalyst.

The foregoing transformations may be diagrammatically represented as follows, in which X represents chloro or bromo

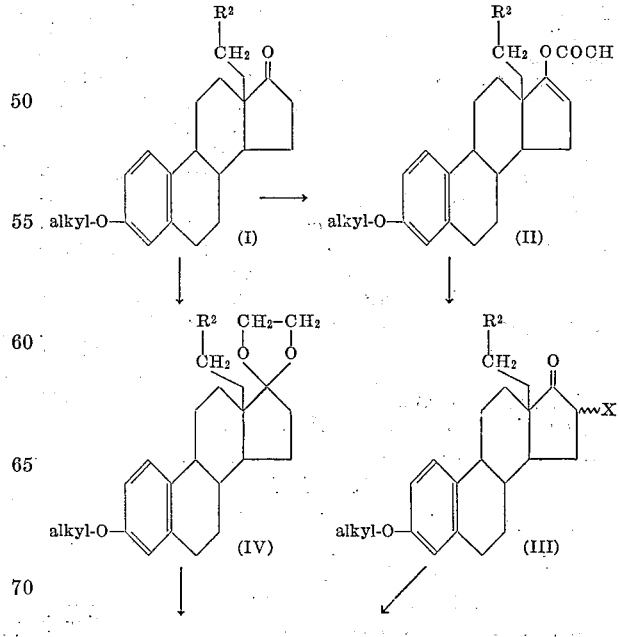

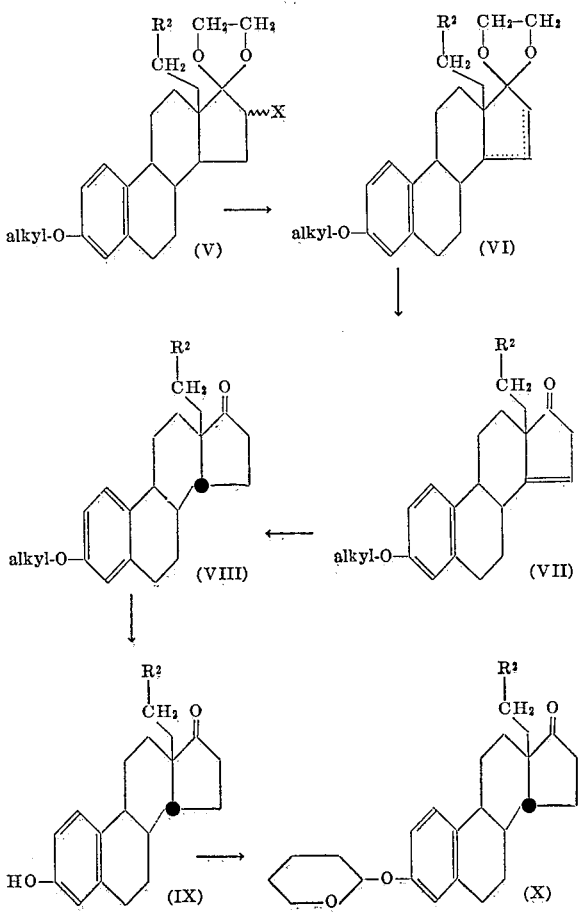

The 17-keto compounds of Formulas VIII, IX or X may be ethylnylated in the 17β-position through the action of lithium acetylide or may be substituted in the 17β-position via the use of the appropriate Grignard reagents, e.g., methylmagnesium bromide, ethynylmagnesium bromide, etc. 17β-alkenyl derivatives, such as vinyl compounds, are preferably obtained from the corresponding 17β-alkynyl compound through controlled hydrogenation.

Unsubstituted 17α-hydroxy products may be formed via conventional reductive procedures from a 17-keto compound, as by treatment with sodium borohydride.

Esterification of a secondary 17α-hydroxy group is accomplished in the usual manner with an acylating agent such as acetic anhydride in pyridine. Likewise esterification of a tertiary 17α-hydroxy is performed as usual under conditions as by the use of acetic anhydride or caproic anhydride in the presence of p-toluenesulfonic acid.

Formation of 17α-tetrahydropyranyloxy ethers is realized through the action of dihydropyran on the free 17α-hydroxy group in the presence of p-toluenesulfonic acid. Selective 17α-esterification in the presence of a free 3-hydroxy group may be realized through formation of the 3-benzoate under Schotten-Baumann conditions, treatment of this monoester with dihydropyran as described above and alkaline hydrolysis of the 3-benzoate to yield the 3-hydroxy-17α-tetrahydropyranyloxy group.

The following examples will serve to further typify the nature of this invention but should not be construed as a limitation on the scope thereof.

Example 1

A mixture of 8 g. of 3-methoxy-18-methylestra-1,3,5(10)-trien-17-one, 10 ml. of ethyl orthoformate, 5 ml. of ethylene glycol and 300 mg. of p-toluenesulfonic acid is refluxed under nitrogen for two hours and then poured into methylene chloride. The organic solution is washed with aqueous bicarbonate solution, dried, treated with 0.5 ml. of pyridine and concentrated in vacuo. The resultant oil is triturated with petroleum ether and allowed to solidify to yield 3-methoxy-17,17-ethylenedioxy-18-methylestra-1,3,5(10)-triene. To a solution of this material (5.66 g.) in 250 ml. of tetrahydrofuran are added an equivalent amount (5.45 g.) of pyridine hydrobromide perbromide. After stirring for 2½ hours at room temperature, 50 ml. of aqueous sodium bicarbonate solution and 500 ml. of water are added. The solution is extracted with methylene chloride and these extracts are then dried over sodium sulfate and evaporated to yield the 16-bromo intermediate. This compound is dissolved in dry xylene and refluxed under nitrogen for 22 hours with 7.5 g. of potassium t-butoxide (obtained by adding 2.62 g. of potassium metal to t-butanol). The mixture is poured into water and extracted with methylene chloride. These extracts are washed with water, dried over sodium sulfate, and evaporated to dryness. The residue is combined with 130 ml. of methanol and 7.2 ml. of 2 N hydrochloric acid and this mixture is refluxed under nitrogen for 5 hours. The solution is then diluted with methylene chloride, washed with dilute aqueous sodium bicarbonate solution, dried over sodium sulfate and evaporated in vacuo. The residue is dissolved in petroleum ether containing a little benzene and chromatographed on silica, eluting with 1:9 ethyl ether:petroleum ether to yield 3 - methoxy - 18 - methylestra-1,3,5(10),15-tetraen-17-one. This material is dissolved in 25 ml. of ethyl acetate and hydrogenated in the presence of 7 g. of pre-redcced 10% palladium-on-charcoal in 475 ml. of ethyl acetate, at room temperature and atmospheric pressure. The hydrogenation is continued until the theoretical amount of hydrogen is absorbed and the catalyst is then removed by filtration and washed well with methylene chloride. The combined washings and filtrates are evaporated to yield 3-methoxy-18-methyl-14β-estra-1,3,5(10)-trien-17-one which may be further purified through recrystallization from acetone:petroleum ether.

In a similar fashion from 3-methoxyestra-1,3,5(10)-trien-17-one, there is obtained 3-methoxy-14β-estra-1,3,5(10)-trien-17-one.

Alternatively these compounds may be obtained through treatment of the 17-keto starting material with isopropenyl acetate and p-toluenesulfonic acid to yield the Δ16-ene-17-acetate. Upon treatment of this enol acetate with chlorine or bromine, the corresponding 16-chloro-17-keto or 16-bromo-17-keto compound is obtained. Upon prolonged refluxing of a mixture of either of these compounds, ethylene glycol and p-toluenesulfonic acid or dinitrobenzenesulfonic acid in toluene, the 16-chloro- or 16-bromo-17,17-ethylenedioxy intermediate is obtained which may be dehydrohalogenated and hydrogenated as previously described.

Example 2

A stream of dry, acetone-free acetylene is introduced under nitrogen into a cooled mixture of dry tetrahydrofuran and 88 ml. of a 15% solution of n-butyl lithium in hexane. One gram of 3-methoxy-18-methyl-14β-estra-1,3,5(10)-trien-17-one, dissolved in a small amount of tetrahydrofuran is then added. After the mixture has stood at room temperature for 24 hours, one-half of the above quantity of lithium acetylide, prepared in the same fashion, is added. This mixture is allowed to stand at room temperature for a further 24 hours and is then cautiously poured into a stirred ice-water mixture. This is then extracted with methylene chloride and these extracts in turn are washed with water, dried and evaporated to dryness. The residue is then chromatographed on silica eluting with 5% isopropyl alcohol in chloroform to yield 3-methoxy-17β-ethynyl-18-methyl-14β - estra - 1,3,5(10) - trien-17α-ol.

Similarly from 3-methoxy-14β-estra-1,3,5(10)-17-one there is obtained 3 - methoxy - 17β - ethynyl - 14β - estra-1,3,5(10)-trien-17α-ol.

Example 3

A solution of 5 g. of 3-methoxy-18-methyl-14β-estra-1,3,5(10)-trien-17-one in 250 ml. of thiophenefree benzene is treated with 27.5 ml. of 4 N methylmagnesium bromide in anhydrous ether. The mixture is heated at reflux under anhydrous conditions for 3 hours, cooled, and cautiously treated with excess aqueous ammonium chloride solution. This mixture is then extracted with ethyl acetate and these extracts are in turn washed with water, dried over sodium sulfate and evaporated to dryness to yield 3-methoxy-17β,18-dimethyl - 14β - estra - 1,3,5(10) - trien-17α-ol which is recrystallized from methylene chloride:hexane.

Example 4

A solution of 8.5 g. of 1,2-dichloroethylene in 50 ml. of anhydrous ether is added in a dropwise fashion, under nitrogen and at 0° C., over a 30 minute period to a stirred solution of 15 ml. of 1.4 N methyl lithium in anhydrous ether. After stirring for an additional 90 minutes at room temperature, a solution of 0.5 g. of 3-methoxy-18-methyl-14β-estra-1,3,5(10)-trien-17-one in 20 ml. of anhydrous ether is added in a dropwise fashion with stirring over a 15 minute period. Stirring at room temperature is continued for 18 hours, and the reaction mixture is then poured into ice water and extracted with ether. These extracts are washed with water, dried over sodium sulfate and concentrated under reduced pressure. The residue is chromatographed on alkaline alumina with 8:2 hexane:ether to yield 3-methoxy-17β-chloroethynyl-18-methyl-14β-estra-1,3,5(10)-trien-17α-ol, which may be recrystallized from methanol.

Example 5

A solution of 1 g. of 3-methoxy-17β-ethynyl-18-methyl-14β-estra-1,3,5(10)-trien-17α-ol in 40 ml. of pyridine is hydrogenated at 25° C. atmospheric pressure in the presence of 0.4 g. of prehydrogenated 2% palladium-on-calcium carbonate. When 1.1 molar equivalents of hydrogen are absorbed, the reaction is stopped. The catalyst is removed by filtration through Celite diatomaceous earth and washed with ethyl acetate and the combined filtrate and washings are evaporated to dryness under reduced pressure. The residue is dissolved in ethyl acetate and this solution then washed with dilute hydrochloric acid and water to neutrality, dried and evaporated to dryness to yield 3-methoxy-17β-vinyl-18-methyl-14β-estra-1,3,5(10)-trien-17α-ol.

Example 6

Two grams of 3-methoxy-17β-ethynyl-18-methyl-14β-ethynyl-18-methyl-14β-estra-1,3,5(10)-trien - 17α - ol is added to 20 ml. of acetic anhydride and p-toluenesulfonic acid. The mixture is allowed to stand at room temperature for one hour and then poured into water. Upon extraction with methylene chloride and drying and evaporation of these extracts, there is obtained 3-methoxy-17α-acetoxy - 17β - ethynyl - 18 - methyl-14α-estra - 1,3,5(10)-triene which may be further purified through chromatography on silica, eluting with benzene and methylene chloride.

By the use of other anhydrides in place of acetic anhydride, the corresponding esters are obtained.

Example 7

Two milliliters of dihydropyran are added to a solution of 1 g. of 3-methoxy-17β-ethynyl-18-methyl-14β-estra-1,3,5(10)-trien-17α-ol in 15 ml. of benzene. About 1 ml. if removed by distillation to remove moisture and 0.4 g. of p-toluenesulfonic acid is added to the cooled solution. This mixture is allowed to stand at room temperature for 4 days, and is then washed with aqueous sodium carbonate solution and water, dried and evaporated. The residue is chromatographed on neutral alumina, eluting with hexane, to yield 3-methoxy-17α-tetrahydropyranyloxy-17β-ethynyl-18-methyl-14β-estra-1,3,5(10)-trien-17α-ol which is recrystallized from pentane.

Example 8

One gram of 3-methoxy-18-methyl-14β-estra-1,3,5(10)-trien-17-one is fused under nitrogen with 1 g. of anhydrous pyridinium hydrobromide and the molten mass is held under reduced pressure for 15 minutes. At the end of this time, the mixture is cooled and chromatographed on silica, eluting with 5% ethyl ether in petroleum ether to yield 3-hydroxy-18-methyl-14β-estra-1,3,5(10)-trien - 17-one. Upon subjecting this compound to the procedure of Example 2, there is obtained 17β-ethynyl-18-methyl-14β-estra-1,3,5(10)-triene-3,17α-diol.

Likewise from 3-methoxy-14β-estra-1,3,5(10)-trien-17-one, there is obtained according to the procedure of this example, 3-hydroxy-14β-estra-1,3,5(10)-trien - 17 - one which may be subjected to the procedures of Examples 2, 3 or 4 to yield 17β-ethynyl-14β-estra-1,3,5(10)-triene-3,17α-diol, 17β-methyl-14β-estra-1,3,5(10)-triene-3,17α-diol and 17β-chloroethynyl-14β-estra-1,3,5(10) - triene-3,17α-diol respectively.

Example 9

Two milliliters of dihydropyran are added to a solution of 1 g. of 3-hydroxy-18-methyl-14β-estra-1,3,5(10)-trien-17-one in 15 ml. of benzene. About 1 ml. if removed by distillation to remove moisture and 0.4 g. of p-toluenesulfonic acid is added to the cooled solution. This mixture is allowed to stand at room temperature for 4 days, and is then washed with aqueous sodium carbonate solution and water, dried and evaporated. The residue is chromatographed on neutral alumina, eluting with hexane, to yield 3 - tetrahydropyranyloxy-18-methyl-14β-estra - 1,3,5(10)-trien-17-one which is recrystallized from pentane.

By subjecting this compound to the procedure of Example 2, there is obtained 3-tetrahydropyranyloxy-17β-ethynyl-18-methyl-14β-estra-1,3,5(10)-trien-17α-ol. Likewise from 3-hydroxy-14β-estra-1,3,5(10)-trien-17 - one, there is obtained via the procedures of this example 3-tetrahydropyranyloxy-17β-ethynyl-18 - methyl - 14β - estra-1,3,5(10) - trien-17α-ol. Likewise from 3-hydroxy - 14β-estra-1,3,5(10)-trien-17-one, there is obtained via the procedures of this example 3 - tetrahydropyranyloxy - 17β-ethynyl-14β-estra-1,3,5(10)-trien-17α-ol.

Example 10

A solution of 1 g. of sodium borohydride in 3 ml. of water is added to an ice-cooled solution of 1 g. of 3-hydroxy-18-methyl-14β-estra-1,3,5(10)-trien-17-one in 120 ml. of methanol and the mixture then allowed to stand for 16 hours at room temperature. The excess reagent is decomposed by addition of acetic acid and the solution is then concentrated to small volume in vacuo and diluted with water. The product is extracted with ethyl acetate and these extracts are washed with water, dried and evaporated to yield 3,17α - dihydroxy-18-methyl - 14β - estra-1,3,5(10)-triene which may be further purified by recrystallization from acetone:hexane.

Similarly 3,17α-dihydroxy-14β-estra-1,3,5(10) - triene is obtained via this procedure from the corresponding 17-keto group.

Example 11

A mixture of 1 g. of 3,17α-dihydroxy-18-methyl-14β-estra-1,3,5(10)-triene, 1 g. of p-toluenesulfonic acid monohydrate, 50 ml. of acetic acid and 25 ml. of acetic anhydride is allowed to stand at room temperature for 24 hours, and then poured into water and stirred. This mixture is then extracted with methylene chloride and these extracts are dried and evaporated to yield 3-benzoyloxy-18-methyl-14β-estra-1,3,5(10)-trien-17α-ol which is recrystallized from acetone:ether.

Two milliliters of dihydropyran are added to a solution of 1 g. of 3-benzoyloxy-18-methyl-14β-estra-1,3,5(10)-trien-17α-ol in 15 ml. of benzene. About 1 ml. is removed by distillation to remove moisture and 0.4 g. of p-toluenesulfonic acid is added to the cooled solution. This mixture is allowed to stand at room temperature for 4 days, and is then washed with aqueous sodium carbonate solution and water, dried and evaporated. The residue is chromatographed on neutral alumina, eluting with hexane, to yield 3-benzoyloxy - 17α - tetrahydropyranyloxy - 18-methyl-14β-estra-1,3,5(10)-triene, which is recrystallized from pentane.

One gram of 3-benzoyloxy-17α-tetrahydropyranyloxy-18-methyl-14β-estra-1,3,5(10)-triene is allowed to stand at room temperature for 15 hours with 1 g. of potassium bicarbonate in 10 ml. of water and 90 ml. of methanol. At the end of this time, the methanol is evaporated under reduced pressure and the residue is extracted with ethyl acetate and water. Evaporation of the ethyl acetate from these extracts yields 17α-tetrahydropyranyloxy-18-methyl-14β-estra-1,3,5(10)-trien-3-ol which is collected by filtration and recrystallized from acetone-hexane.

In a similar fashion, the foregoing procedure is employed to prepare 17α-tetrahydropyranyloxy-14β-estra-1,3,5(10)-trien-3-ol.

What is claimed is:

1. Compounds of the formula:

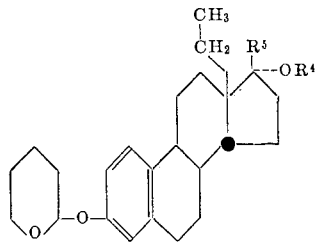

wherein
$R^4$ is hydrogen, tetrahydropyranyl, or a hydrocarbon carboxylic acyl group of less than 12 carbon atoms; and
$R^5$ is (lower)alkyl, (lower)alkenyl, (lower)alkynyl or halo(lower)alkynyl.

2. The 14β-estra-1,3,5(10)-triene according to claim 1 wherein $R^4$ is hydrogen and $R^5$ is ethynyl.

3. Compounds of the formula:

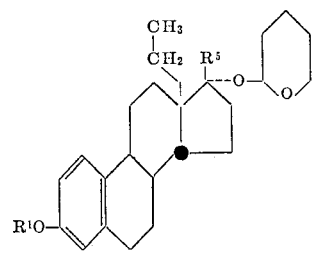

wherein
$R^1$ is hydrogen or (lower)alkyl;
$R^5$ is hydrogen, (lower)alkyl, (lower)alkenyl, (lower)-alkynyl or halo(lower)alkynyl.

4. The 14β-estra-1,3,5(10)-triene according to claim 3 wherein $R^1$ is hydrogen and $R^5$ is hydrogen.

References Cited

UNITED STATES PATENTS

| | | | |
|---|---|---|---|
| 3,075,970 | 1/1963 | Nomine et al. | 260—239.55 |
| 3,134,771 | 5/1964 | Ruggieri et al. | 260—239.55 |
| 3,189,528 | 6/1965 | Smith et al. | 195—51 |
| 3,256,273 | 6/1966 | Gross | 260—239.55 |
| 3,179,674 | 4/1965 | Laskin et al. | 260—397.4 |

FOREIGN PATENTS 623,842  4/1963  Belgium.

OTHER REFERENCES

Fieser et al.: Steroids, N.Y., Reinhold, 1959, pp. 465, 466, and 476.

Johnson et al.: J. Am. Chem. Soc., 79, 2005–2009 (1957), pages 2005 and 2006 relied on.

St. Andre et al.: J. Am. Chem. Soc., 74, 5506–5511 (1952), page 5508 relied on.

Appleweig: Steroid Drugs, N.Y., McGraw-Hill, 1962, vol. I pp. 304 and 453.

LEWIS GOTTS, *Primary Examiner.*

T. MESHBESHER, *Assistant Examiner.*